United States Patent [19]

Henke et al.

[11] Patent Number: 4,743,070
[45] Date of Patent: May 10, 1988

[54] TIRE RIM CLAMP

[75] Inventors: Harlan H. Henke, Burlington, Iowa; William R. Borthick, Glenpool, Okla.

[73] Assignee: Unit Rig & Equipment Company, Tulsa, Okla.

[21] Appl. No.: 913,124

[22] Filed: Sep. 29, 1986

[51] Int. Cl.⁴ ............................................. B60B 25/14
[52] U.S. Cl. ............................. 301/13 SM; 301/19; 301/36 R; 152/376
[58] Field of Search .............. 301/13 SM, 13 R, 36 R, 301/18, 19, 20, 22, 35 SL; 152/375, 376, 396, 409, 410, DIG. 8

[56] References Cited

U.S. PATENT DOCUMENTS

| | | | |
|---|---|---|---|
| 2,537,180 | 1/1951 | Ash | 301/13 SM |
| 3,007,741 | 11/1961 | Brown | 152/376 X |
| 3,468,584 | 9/1969 | Tantlinger | 301/13 SM |
| 4,142,569 | 3/1979 | Walther et al. | 301/13 SM X |

Primary Examiner—Robert B. Reeves
Assistant Examiner—Russell D. Stormer
Attorney, Agent, or Firm—Head & Johnson

[57] ABSTRACT

An improved tire rim clamp for retaining the dual tires and rims of a large mining truck or the like comprising a cylindrical member having a plurality of slotted openings circumferentially distributed around the inner beveled edge of the cylinder and a circular retention bolt flange extending radially inward at the other end of the cylinder such that the tire rim clamp can occupy the annulus formed between the axle housing and outer tire rim when bolted in place. Such a one piece tire rim clamp can be inserted into the outer tire rim when mounted to the axle housing using powered equipment, thus eliminating the difficult manual task of inserting and positioning a plurality of individual tire clamps during assembly or the servicing of the dual tires on a mining truck or the like.

1 Claim, 5 Drawing Sheets 4,743,070

TIRE RIM CLAMP

BACKGROUND OF THE INVENTION

1. Field of the Invention

This invention relates to an improved tire rim clamp. More specifically, this invention relates to an improved clamp rim for electric motor powered dual wheeled large mining truck and similar heavy construction equipment.

2. Description of the Prior Art

It is generally known and an accepted commercial practiace to provide large mining trucks and comparable heavy equipment with dual tires and rims that are concentrically mounted to an electrically powered rim on an axle housing wherein the electric motor is located within the axle housing. The electric motor driving the dual tires and rims in such equipment is frequently powered by a diesel engine driving an electrical generator or the like. In such mining trucks and similar heavy equipment, the dual tires and rims are convenitonally sequentially mounted to the rear axle housing. Typically, the inner tire and rim are concentrically positioned on the rear axle housing, followed by a concentric spacer and then the outer tire and rim. A series of individual rim clamps are then inserted into the annulus created between the outer tire rim and the inner axle housing and then bolted to the driven hub assembly on the axle housing, thus completing the assembly of the dual tires and rims.

Usually, the clamps of the tire rim retention device of the prior art, as described above, have to be installed individually by hand because there is not enough room to use lifting equipment to handle the clamps. However, the clamps of the prior art could be quite heavy and must usually be lifted by one person, making the overall process very difficult.

SUMMARY OF THE INVENTION

In view of the prior art, the present invention provides an improved tire rim clamp that eliminates the process of manually inserting a series of individual clamps into the annulus formed between the wheel housing and wheel rim. This is accomplished, according to the present invention, by use of a single essentially cylindrical tire rim clamp that fits into the annulus formed by the wheel housing and wheel rim. The improved tire rim clamp according to the present invention is equipped with a beveled or chamfered inner edge such as to compressively mate with the outer tire rim, thus holding the dual tires and rims in place. To assist in this compressive engagement of the tire rim clamp to the outer tire rim, the inner portion of the cylindrical clamp is periodically slotted to afford a degree of flex in the tire clamp. The outer portion of the improved clamp, according to the present invention, is further slotted to provide for access to the disc brake and brake calipers, tire air inflation stems, drive gear lubricatnt drain ports or the like. The outer edge of the cylindrical clamp is further provided with a flange that bolts to the driven part of the hub assembly associated with the wheel housing such as to hold the dual tires and rims in place.

Thus, the present invention provides an improved tire rim clamp comprising:

(a) an essentially cylindrical member adapted to concentrically fit within the annulus created between the outer tire rim and axle housing, wherein the cylindrical member terminates at one end in a beveled surface and a plurality of periodically slotted openings such as to operatively engage with the outer tire rim during use and such as to provide for radial deflection during use; and (b) a circular flange member operatively attached to the other end of the cylindrical member and extending radially inward wherein the circular flange member contains a plurality of openings distributed around the cylindrical member such as to accept retaining bolts that hold the tire rim clamp to the driven hub assembly during use.

It is an object of the present invention to provide an improved tire clamp that is a single unit. It is a further object that the single unit operatively engages with a conventional dual tire, rim and spacer system. And, it is still a further object that the improved tire clamp be compatible with being mounted on the axle housing simultaneously with the mounting of the outer tire and rim. Fulfillment of these objects and the presence and fulfillment of additional objects will be apparent upon complete reading of the specification and claims in conjunction with the attached drawings.

DESCRIPTION OF THE PREFERRED EMBODIMENTS

Figure 1:
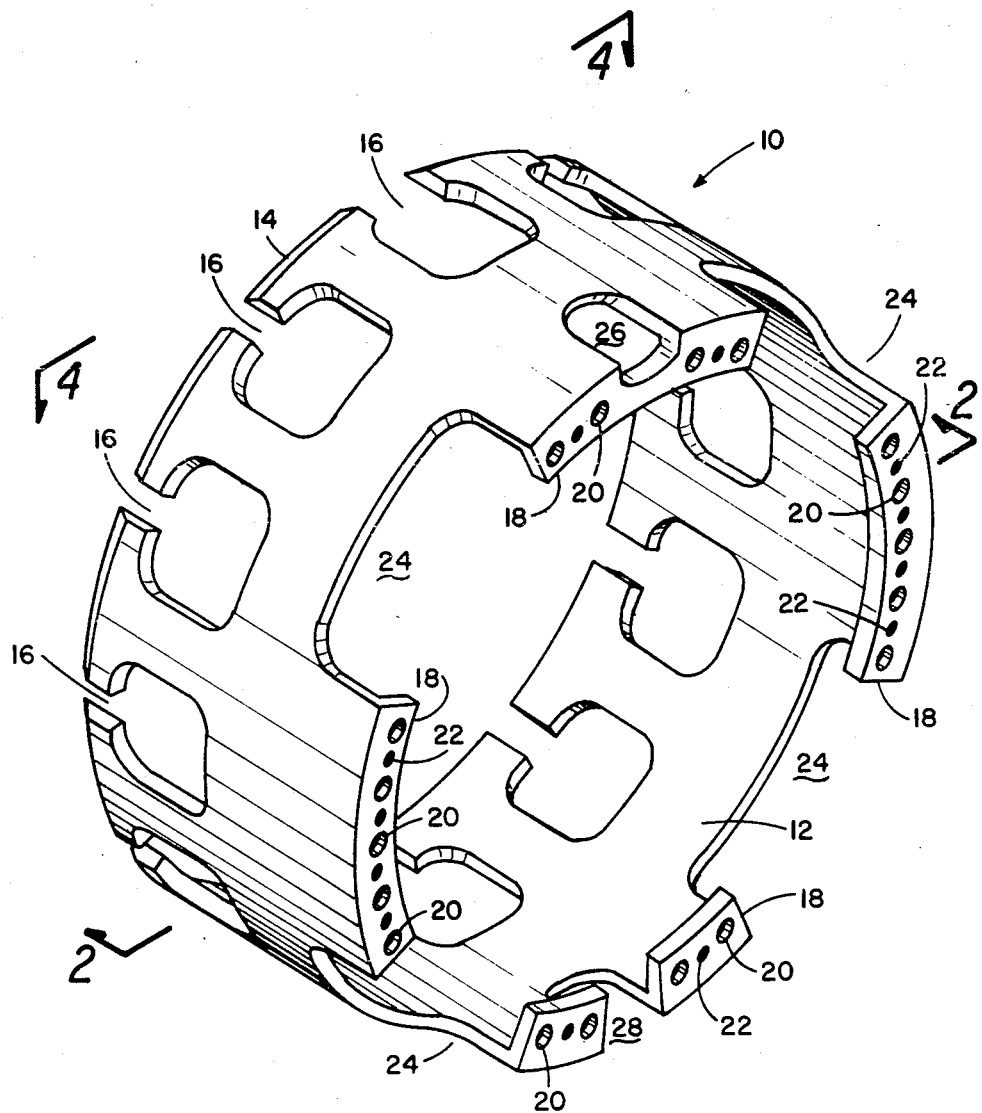
FIG. 1 is an isometric view of one preferred embodiment of the improved tire rim clamp according to the present invention.
Figure 2:
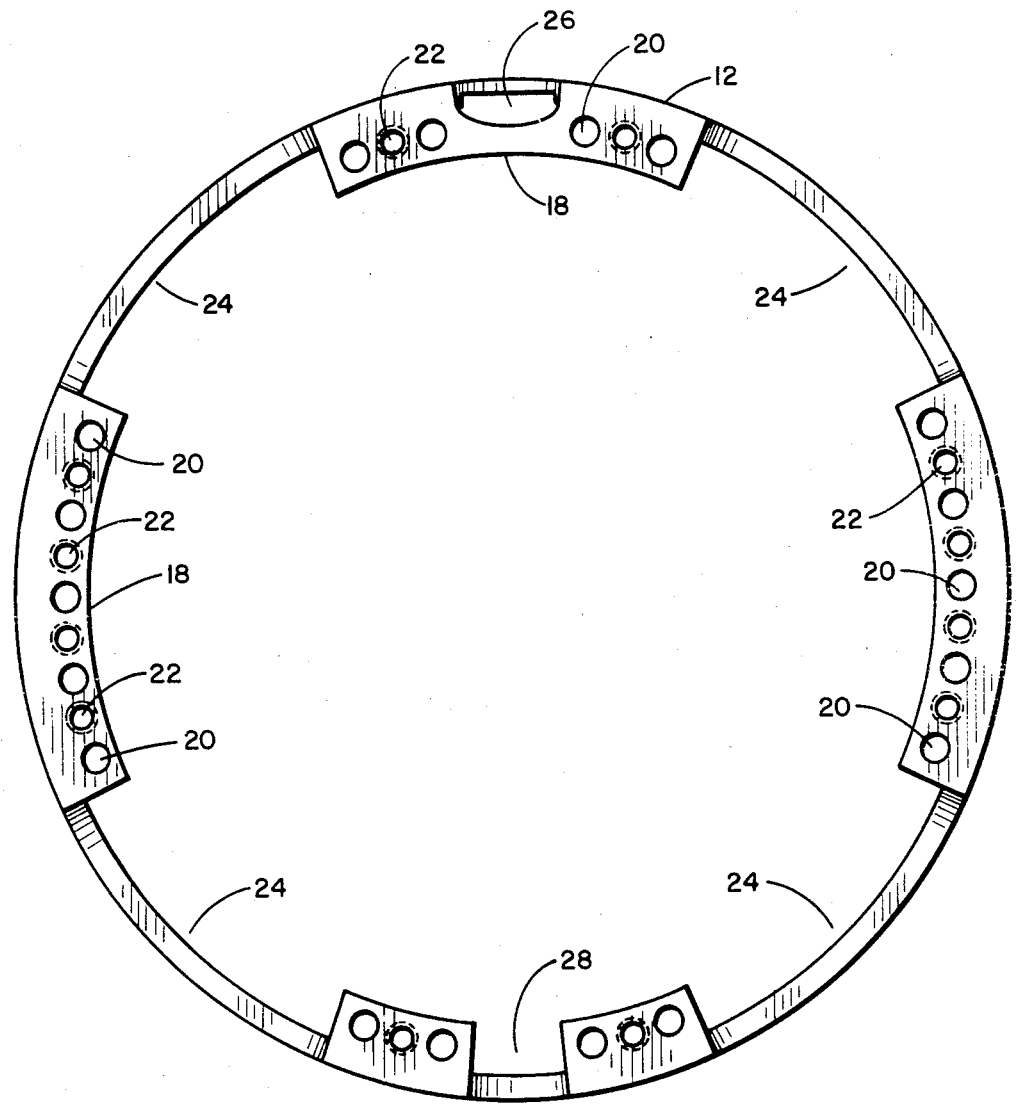
FIG. 2 is an outer view of the improved tire rim clamp of FIG. 1 as seen through line 2—2.
Figure 3:
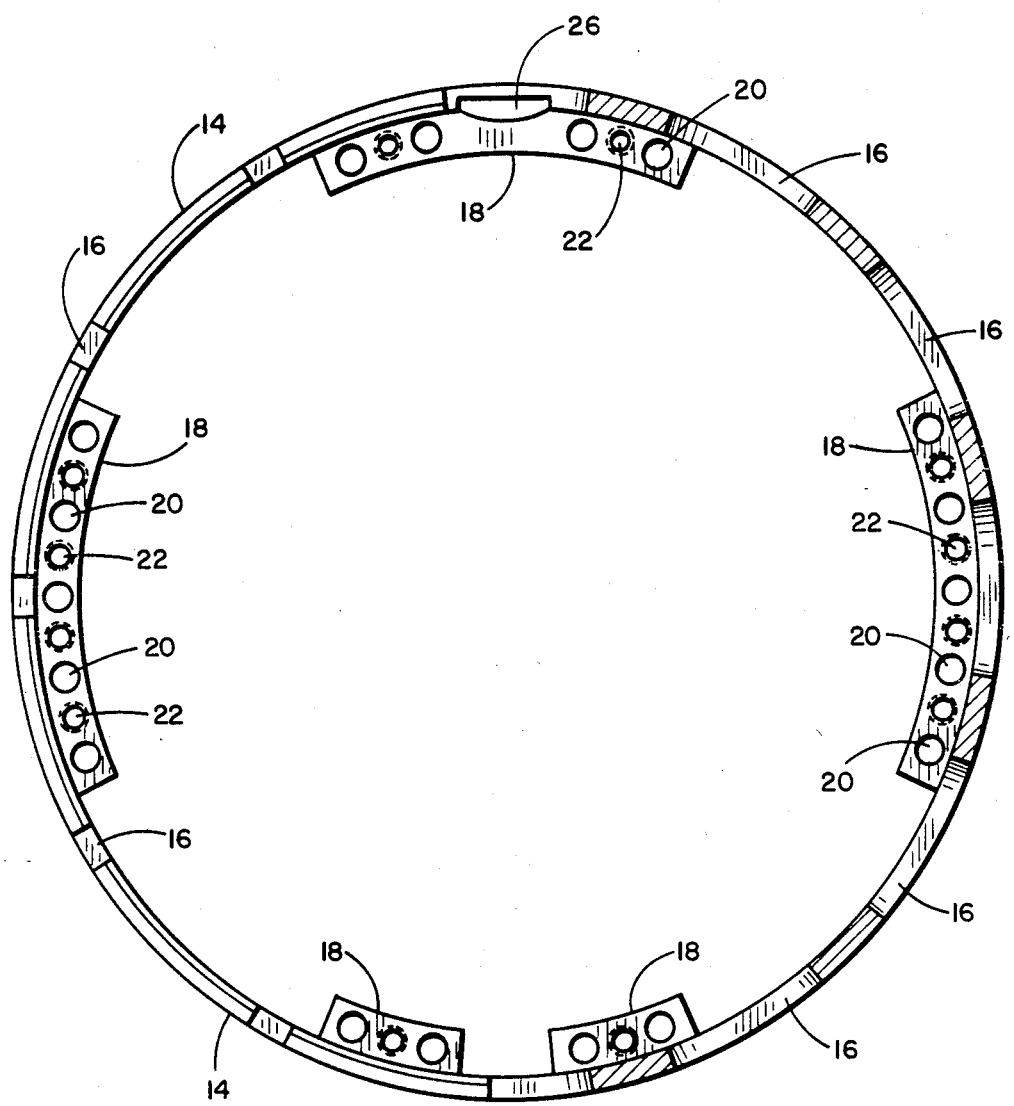
FIG. 3 is an inner view of the improved tire rim clamp of FIG. 1 as seen through line 3—3.
Figure 4:
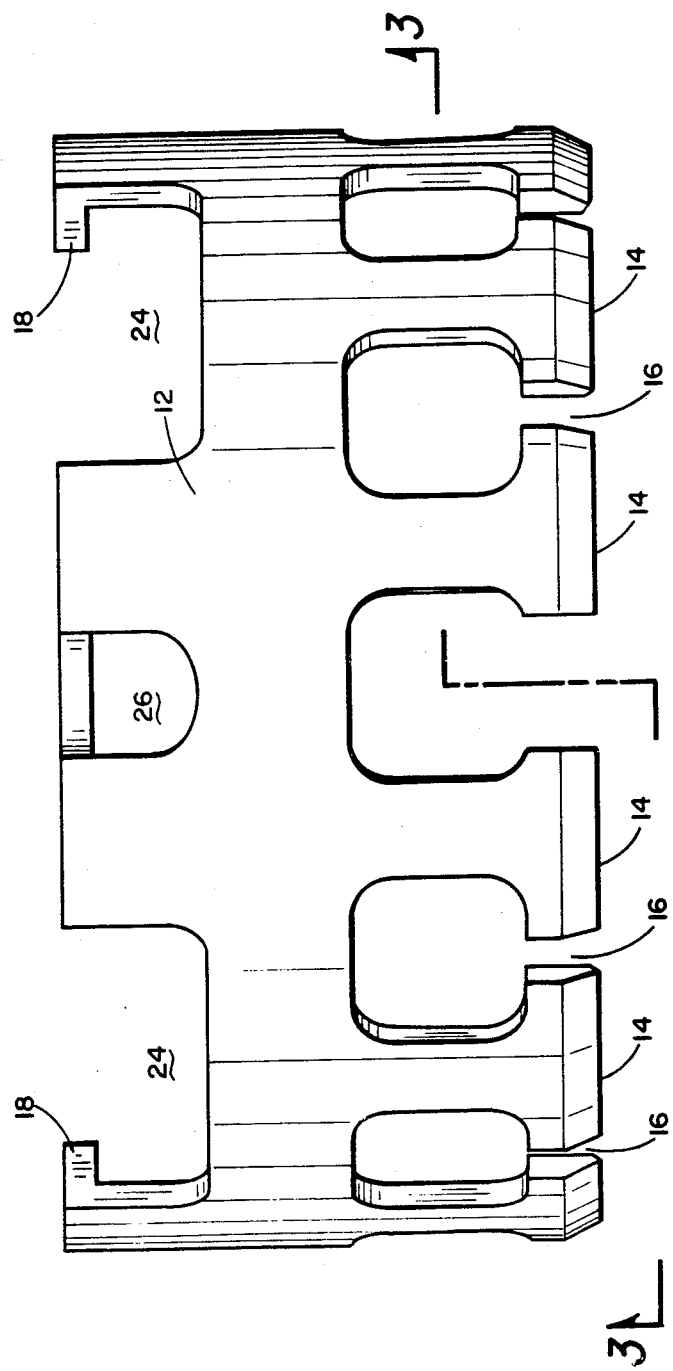
FIG. 4 is a top view of the improved tire rim of FIG. 1 as seen through line 4—4.

The improved tire rim clamp according to the present invention, how it functions and how it differs from the prior art tire clamps and the advantages associated with its use can perhaps best be explained and understood by reference to the drawings. FIG. 1 illustrates one particular preferred embodiment of the tire rim clamp according to the present invention, generally designated by the numeral 10. As shown in FIG. 1 and as further illustrated in FIGS. 2 through 4, the tire rim clamp 10 is essentially a single cylindrical unit 12 that at one end terminates in a beveled edge 14 that is intended to engage with the inner beveled surface of the outer tire rim somewhat analogous to the prior individual tire clamps as further explained and illustrated later. The veled inner edge 14 is further periodically slotted with a plurality of openings 16 that allow for a degree of radial flexing of the inner beveled edge 14.

As further shown in the figures, the other end of the cylindrical unit 12 is equipped with a circular flange 18 that extends radially inward and has a plurality of attachment bolt holes 20 as well as jack-out holes 22 distributed about the circumference of the cylinder 10. This flange 18 and the sidewalls of the cylinder 10 are further interrupted periodically with the presence of a plurality of openings 24, 26 and 28. The opening 24 of the particular embodiment being illustrated in the drawings accommodates access to the brake disc attachment bolts 30 (see FIG. 5). The smaller partial opening 26 allows the tire air stems (not shown) to protrude outwardly while the opening 28 allows for operator access to the drive mechanism lubricant drain port (not shown).

Figure 5:
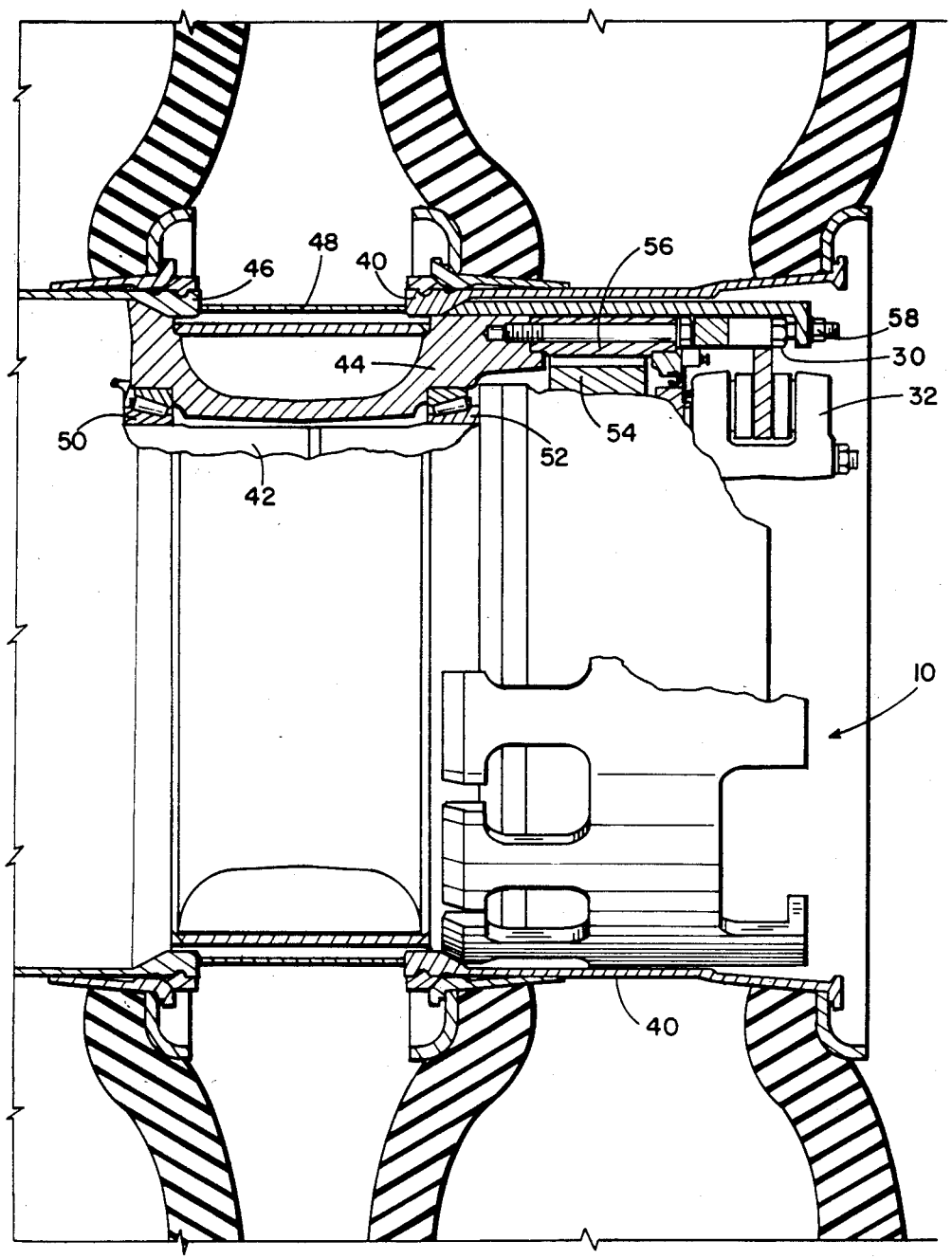
FIG. 5 is a partial cross-sectional view of a dual tire and rim mounted to an axle housing of a mining truck with the tire rim clamp according to the present invention occupying the annulus formed between the outer tire rim and the axle housing.

As illustrated in FIG. 5, the tire rim clamp 10 during use is intended to occupy the annular space between the outer tire and rim 40 and the axle hub 44. As further illustrated in FIG. 5, the outer rim of the axle hub 44 accepts both the inner tire and rim 46, a spacer 48 located between the outer and inner rims and the outer tire and rim 40. The tire rim clamp 10 is also bolted to the driven gear 56 which in turn is bolted to the hub 44 making up the hub assembly, thus compressively holding both tires and rims 40 and 46 in place during use. As such, the entire outer hub assembly and dual wheel system with the tire rim clamp 10 revolve on the wheel bearings 50 and 52 while being driven by the intermeshed drive gear 54 and driven gear 56. The drive gear 54 in turn is powered by an electric motor and drive shaft (not shown) located within the axle housing 42. As further indicated or suggested in FIG. 4 and as previously mentioned, theouter flanged edge of the cylindrical tire rim clamp 10 is further notched or segmented with periodic openings to allow access to the brake disc attachment bolts 30, tire air stem and lubricant drain port (not shown).

In order to assemble the dual tire and rim onto the axle housing, the inner tire and rim is initially mounted concentrically to the axle housing. Because of the size of the tire employed on mining trucks and the like, this requires a forklift or other powered equipment for placement of the tire and rim. Once the inner tire has been properly positioned, the spacer that occupies the space between the pair of rims can be installed. At this point in the assembly, the tire rim clamp according to the present invention is preferably positioned within the outer tire rim and the same powered equipment employed in mounting the inner tire and rim can be used to mount simultaneously the outer tire, rim and tire rim clamp positioned concentrcially within the rim. Conveniently, a tool or fixture can be employed to grip the assembly as generally known in the art. Once the outer tire and rim with concentric spacer have been positioned on the axle housing, the attachment bolts 58 can then be inserted and tightened such as to compress and hold the tire rim clamp against the outer tire rim, spacer and inner tire rim; thereby, completing the assembly. Disassembly can be achieved essentially in the reverse order. Thus, the use of the single piece tire rim clamp according to the present invention eliminates the difficult manual task of inserting individual tire rim clamps of the prior art around the outer rim and axle housing annulus. This in turn represents a savings in time and manual effort.

It should be appreciated that the actual construction of the improved tire rim clamp according to the present invention can be out of any contemporary structural material as generally known in the art. It should be further appreciated that the presence and location of specific openings and slots as well as the direction orientation and sizing of individual elements making up the tire rim clamp according to the present invention can vary from application to application, provided the basic concept of using a cylindrical one piece unit with beveled and slotted inner surface for radial flexing and engagement to the inner tire rim and an outer flange for receiving attachment bolts are present.

Having thus described and invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

We claim:

1. An improved tire rim clamp for use in the annular area between an inner cylindrical axle housing affixed to an axle hub and an outer cylindrical tire rim for retaining the tire rim onto said axle hub, the tire rim clamp comprising:
    (a) a cylindrical, relatively long member adapted to concentrically fit within the annulus created between an outer cylindrical tire rim and an inner cylindrical axle housing, wherein said cylindrical member terminates at a first end in a beveled peripheral surface and a plurality of spaced apart slots extending from said beveled peripheral surface such as to operatively engage with a tire rim during use and, said slots providing for radial deflection of the portions of the cylindrical member adjacent said first end and between said slots during use; and
    (b) a circular flange member integrally attached to the other end of said cylindrical member and extending radially inward, said circular flange member containing a plurality of openings distributed around said cylindrical member such as to accept retaining bolts that hold the cylindrical member to an axle hub during use, said flange member and said other end of the cylindrical member contains a plurality of slotted openings to accommodate access to an axle housing.

* * * * *